(12) United States Patent
Brammer et al.

(10) Patent No.: US 11,971,090 B2
(45) Date of Patent: Apr. 30, 2024

(54) METHODS AND SYSTEMS FOR A MULTI-SPEED ELECTRIC AXLE ASSEMBLY

(71) Applicant: Dana Heavy Vehicle Systems Group, LLC, Maumee, OH (US)

(72) Inventors: Andrew T. Brammer, Toledo, OH (US); Michael D. Cook, Holland, OH (US); Jordan M. Houser, Sylvania, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/301,884

(22) Filed: Apr. 17, 2023

(65) Prior Publication Data

US 2023/0250862 A1 Aug. 10, 2023

Related U.S. Application Data (62) Division of application No. 16/842,570, filed on Apr. 7, 2020, now Pat. No. 11,674,566.

(60) Provisional application No. 62/831,784, filed on Apr. 10, 2019.

(51) Int. Cl.
*F16H 3/66* (2006.01)
*F16H 37/08* (2006.01)

(52) U.S. Cl.
CPC ......... *F16H 3/663* (2013.01); *F16H 37/0806* (2013.01); *F16H 2200/0021* (2013.01); *F16H 2200/0039* (2013.01); *F16H 2200/2007* (2013.01)

(58) Field of Classification Search
CPC .......... B60K 1/00–02; B60K 17/00–08; F16H 3/663; F16H 2200/202–2028; F16H 2200/2038–2061; F16H 2200/0039–0078
See application file for complete search history.

(56) References Cited

U.S. PATENT DOCUMENTS

| | | |
|---|---|---|
| 7,980,980 B2 | 7/2011 | Rask et al. |
| 8,012,057 B2 | 9/2011 | Meixner |
| 8,506,448 B2 | 8/2013 | Hokoi |
| 8,556,760 B2 | 10/2013 | Mack et al. |
| 9,139,079 B2 | 9/2015 | Suntharalingam et al. |
| 9,421,855 B2 | 8/2016 | Suntharalingam et al. |
| 9,453,564 B1 | 9/2016 | Pritchard et al. |

(Continued)

FOREIGN PATENT DOCUMENTS

| | | |
|---|---|---|
| CN | 104553767 A | 4/2015 |
| CN | 108290485 A | 7/2018 |

(Continued)

*Primary Examiner* — Ernesto A Suarez
*Assistant Examiner* — Lillian T Nguyen
(74) *Attorney, Agent, or Firm* — McCoy Russell LLP (57) ABSTRACT

Various methods and systems are provided for a multi-speed electric axle assembly with three gear ratios. The multi-speed electric axle assembly includes one or more power supplies, one or more shafts operatively coupled to the one or more power supplies and a differential, and one or more Ravigneaux gear assemblies integrated with the one or more shafts. The one or more Ravigneaux gear assemblies of the multi-speed electric axle assembly providing the three gear ratios.

11 Claims, 5 Drawing Sheets

(56) References Cited

U.S. PATENT DOCUMENTS

| | | |
|---|---|---|
| 9,841,092 B2 | 12/2017 | Wenthen et al. |
| 9,878,638 B2 | 1/2018 | Wein et al. |
| 9,944,166 B2 | 4/2018 | Janson et al. |
| 10,253,857 B2 | 4/2019 | LaForce |
| 2002/0091032 A1* | 7/2002 | Hayabuchi ............ F16H 37/04 475/285 |
| 2003/0064847 A1 | 4/2003 | Oshidari et al. |
| 2003/0224892 A1 | 12/2003 | Yamauchi et al. |
| 2006/0154771 A1* | 7/2006 | Klemen ................ B60K 6/445 475/5 |
| 2007/0093341 A1 | 4/2007 | Supina et al. |
| 2007/0099748 A1 | 5/2007 | Matsubara et al. |
| 2007/0270262 A1 | 11/2007 | Raghavan et al. |
| 2008/0153660 A1 | 6/2008 | Uejima et al. |
| 2008/0196955 A1 | 8/2008 | Minamikawa |
| 2009/0098969 A1 | 4/2009 | Tabata et al. |
| 2011/0010063 A1* | 1/2011 | Ota ........................ F16H 61/50 475/61 |
| 2012/0190496 A1* | 7/2012 | Samie ................... F16H 3/666 475/275 |
| 2013/0151057 A1 | 6/2013 | Matsubara et al. |
| 2015/0267780 A1* | 9/2015 | Meyer ................... F16H 3/666 475/279 |
| 2015/0273998 A1 | 10/2015 | Kiyokami et al. |
| 2015/0330492 A1* | 11/2015 | Lee ................... F16H 37/0813 475/331 |
| 2019/0077247 A1 | 3/2019 | Schwekutsch et al. |
| 2020/0096084 A1* | 3/2020 | Engerman ............. F16H 3/006 |

FOREIGN PATENT DOCUMENTS

| | | | |
|---|---|---|---|
| CN | 108869691 A | 11/2018 | |
| DE | 102010032256 A1 * | 1/2012 | ............. B60K 1/00 |
| DE | 102010032256 A1 | 1/2012 | |
| DE | 102015214334 A1 | 2/2017 | |
| DE | 102016004373 A1 | 10/2017 | |
| DE | 102017220166 B3 | 3/2019 | |
| DE | 102018130122 A1 * | 5/2020 | |
| JP | 08247230 A * | 9/1996 | ............ F16H 3/663 |

* cited by examiner

METHODS AND SYSTEMS FOR A MULTI-SPEED ELECTRIC AXLE ASSEMBLY

CROSS REFERENCE TO RELATED APPLICATIONS

The present application is a divisional of U.S. Non-Provisional patent application Ser. No. 16/842,570 entitled "METHODS AND SYSTEMS FOR A MULTI-SPEED ELECTRIC AXLE ASSEMBLY", and filed on Apr. 7, 2020. U.S. non-Provisional patent application Ser. No. 16/842,570 claims priority to U.S. Provisional Patent Application No. 62/831,784, entitled "MULTI-SPEED ELECTRIC AXLE ASSEMBLY", and filed on Apr. 10, 2019. The entire contents of the above-listed applications are incorporated herein by reference for all purposes.

FIELD

Embodiments of the subject matter disclosed herein relate to a multi-speed electric vehicle axle assembly.

BACKGROUND

Axle assemblies for electric vehicles may include a single-speed transmission as electric motors have a wider rpm window in which the motor can operate efficiently as compared to internal combustion engines. However, the use of single-speed transmissions in electric vehicles demands compromise between low-end acceleration and increased speeds with most manufacturers favoring acceleration over higher speeds.

BRIEF DESCRIPTION

Further, even in multi-speed electric vehicle transmissions, the desire for minimum weight and a compact package can limit the speed ratios available. As such, in one embodiment, a system includes a multi-speed electric axle assembly with three gear ratios. The multi-speed electric axle assembly includes one or more power supplies, one or more shafts operatively coupled to the one or more power supplies and a differential, and one or more Ravigneaux gear assemblies integrated with the one or more shafts. The one or more Ravigneaux gear assemblies of the multi-speed electric axle assembly provide the three gear ratios.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Electric vehicles (EVs) may employ a single gear to drive the wheels as electric motors have a wider RPM window in which the motor can operate efficiently as compared to conventional internal combustion engines, with the motors being power efficient throughout the entire range of the RPM window. As such, EVs do not demand a specific RPM range to be used during low-speed driving or under acceleration and may produce almost instantaneous torque from zero revs. Thus, a gear ratio for an electric vehicle axle assembly that contains a balance between acceleration and top speed is selected. If the gear ratio is too low, the EV may accelerate very quickly but be limited to a low top speed. Alternatively, if the gear ratio is high, the gearing may be optimal for top speeds but acceleration will be limited. As such, there is a demand for EVs that may achieve increased speeds without comprising acceleration. Further, different customer applications (e.g., racing applications) may demand or benefit from an electric axle assembly having multiple gear ratios.

Thus, according to the embodiments disclosed herein, a multi-speed electric axle assembly that permits an EV to have three individual gear ratios is provided. The multi-speed electric axle assembly comprises one or more power supplies and a set of shafts integrated with a gear assembly, with exactly three individual gear ratios achieved by locking different portions of the gear assembly. The individual gear ratios may be selected via various clutch actuations using a set of actuators and clutches. By employing the multi-speed electric axle assembly, EVs may have better launch performance using lower gears, more efficient high-speed driving using higher gears, and achieve increased speeds without limiting acceleration. Further, as a single manual transmission style shift synchronizer may be used for all three gears, the cost, weight, and complexity of the gearbox may be reduced. Additionally, by advantageously utilizing the three gears, mid-speed performance may be increased as well as overall vehicle efficiency as the motor and driveline may be maintained in a peak efficiency zone. In some examples, the gear assembly may be a Ravigneaux or Ravigneaux-type gear set. The Ravigneaux or Ravigneaux-type gear set may be advantageous when three gear ratios are demanded as the gear set provides a compact solution as compared to other gear architectures. All three gear ratios may be achieved by selectively grounding a component (e.g., a planetary gear carrier, a large sun gear) of the Ravigneaux or Ravigneaux-type gear set, with the third gear creating a 1:1 final ratio. Utilizing a 1:1 final ratio may also increase vehicle efficiency by means of friction reduction which, in turn, leads to an increased driving range for the vehicle.

Embodiments of a multi-speed electric axle assembly are illustrated in FIGS. 1-5. Each embodiment may be utilized as an electric drive axle. Each embodiment may have applications in commercial vehicles, both light duty and heavy duty vehicles, and for passenger, off-highway, and sport utility vehicles. Additionally, each embodiment of the multi-speed electric axle assembly may be adapted for use in front and/or rear driving axles, as well as steerable and non-steerable axles. The multi-speed electric axle assemblies described herein may also have industrial, locomotive, military, agricultural, and aerospace applications.

Figure 1:
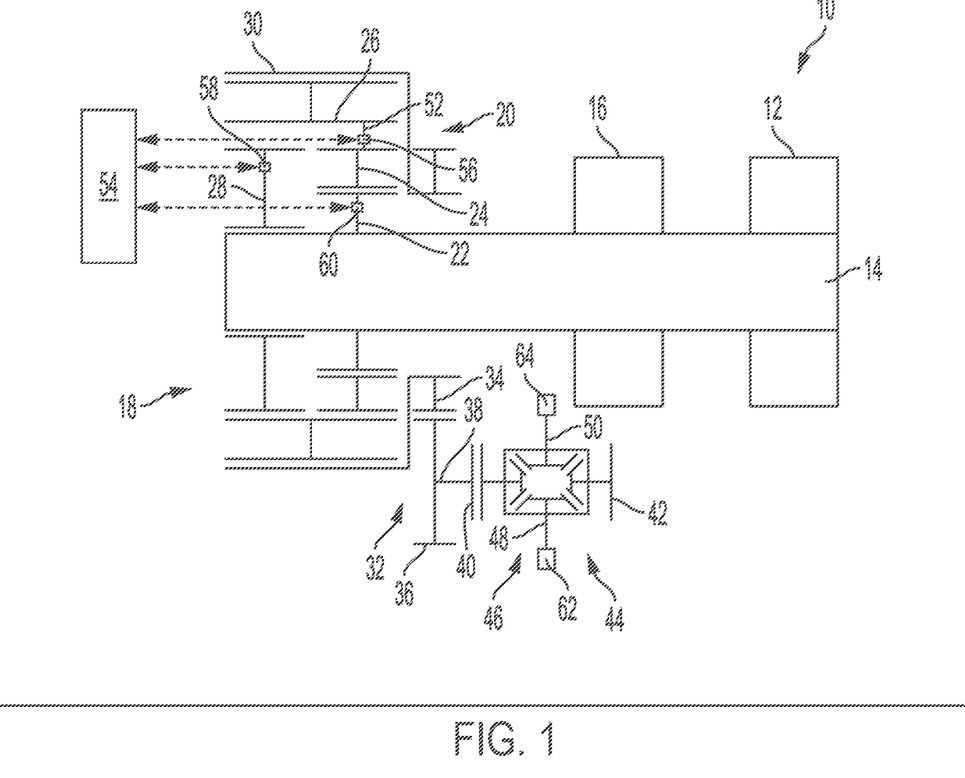
FIG. 1 is a schematic view of a first embodiment of a multi-speed electric axle assembly in accordance with the present disclosure.

A first embodiment of the multi-speed electric axle assembly 10 in a vehicle 1 is shown in FIG. 1. The axle assembly 10 includes a first electric motor generator 12, a second electric motor generator 16, and a first shaft 14. The first electric motor generator 12 and the second electric motor generator 16 each provide power which can drive the axle assembly 10. The first shaft 14 is operably coupled to the first electric motor generator 12 for rotation. In some examples, the first shaft 14 may also be operably coupled to the second electric motor generator 16 for rotation. In some examples, the first shaft 14 may be supported for rotation by one or more bearings. The first shaft 14 extends from the first and second electric motor generators 12, 16 into a first gear assembly 18. Power communicated to the first gear assembly 18 from the first and second electric motor generators 12, 16 is transmitted by the first shaft 14 into only one side 20 of the first gear assembly 18.

The first gear assembly 18 comprises a first sun gear 22. The first sun gear 22 is operably coupled to the first shaft 14 and rotates therewith. The first sun gear 22 is in meshed engagement with a first planetary gear set 24. The first planetary gear set 24 is in meshed engagement with a second planetary gear set 26. The second planetary gear set 26 is in meshed engagement with the first planetary gear set 24, a second sun gear 28, and a ring gear 30. The first sun gear 22 has an outermost diameter that is smaller than an outermost diameter of the second sun gear 28. The first planetary gear set 24 and the second planetary gear set 26 are coupled to a planet carrier 52. The first planetary gear set 24 and the second planetary gear set 26 rotate independently of the planet carrier. The first planetary gear set 24 and the second planetary gear 26 set co-rotate with a fixed gear ratio with respect to each other. In some embodiments, the first gear assembly 18 may be a Ravigneaux gear set.

In some embodiments, rotation locking assemblies may be selectively engageable with different portions of the first gear assembly 18 thereby permitting the vehicle 1 to operate at three different gear ratios. For example, the rotation locking assemblies may be clutches and actuators communicatively coupled to a controller 54. In response to user input, the controller 54 may send a signal causing one or more of the clutches to selectively engage a portion of the first gear assembly 18. A first clutch 56 may be selectively engageable with at least a portion of the planet carrier 52. When the first clutch 56 is engaged with the planet carrier 52, the planet carrier 52 is held stationary and does not rotate. A second clutch 58 may be selectively engageable with at least a portion of the second sun gear 28. When the second clutch 58 is engaged with the second sun gear 28, the second sun gear 28 is held stationary and does not rotate. A third clutch 60 may be selectively engageable with at least a portion of the first sun gear 22 and the second sun gear 28. When the third clutch 60 is engaged with the first sun gear 22 and the second sun gear 28, the first sun gear 22 and the second sun gear 28 are held and rotate together.

The ring gear 30 is fixedly coupled to a second gear assembly 32. The second gear assembly 32 comprises a first gear 34. The first gear 34 is in meshing engagement with a second gear 36. The second gear 36 is operably coupled with a second shaft 38. The second shaft 38 may be supported for rotation with one or more bearings. In some embodiments, the second shaft 38 is provided in a parallel relationship with the first shaft 14. A third gear 40 may be disposed at an end of the second shaft 38. The third gear 40 may be of the pinion variety and is in meshing engagement with a ring gear 42 disposed on a differential 44. The differential 44 may be operatively attached to an axle 46. The axle 46 may comprise a first axle shaft 48 and a second axle shaft 50. The first axle shaft 48 may be operatively coupled to a first wheel 62 and the second axle shaft 50 may be operatively coupled to a second wheel 64.

Thus, the vehicle may operate at a first gear ratio, a second gear ratio, and a third gear ratio. A first gear ratio may be output when the planet carrier 52 is held stationary and does not rotate. A second gear ratio may be output when the second sun gear 28 is held stationary and does not rotate. A third gear ratio may be output when the first sun gear 22 and the second sun gear 28 are held and rotate together. The first, second and third gear ratios may be specified as 3.850:1, 1.974:1 and 1:1, respectively. This particular ratio selection and overall ratio spread may provide sufficient ratio overlap for the rpm range of the motor generators 12, 16. In some examples, the first, second, and third gear ratios may not be specified as 3.850:1, 1.974:1 and 1:1, respectively. As illustrated in FIG. 1, the multi-speed axle assembly 10 may be in a perpendicular configuration. As used herein the phrase "perpendicular configuration" refers to the electric motor generator(s) providing power that is transmitted perpendicular to the orientation of the axle driving wheel rotation (e.g., axle 46).

Figure 2:
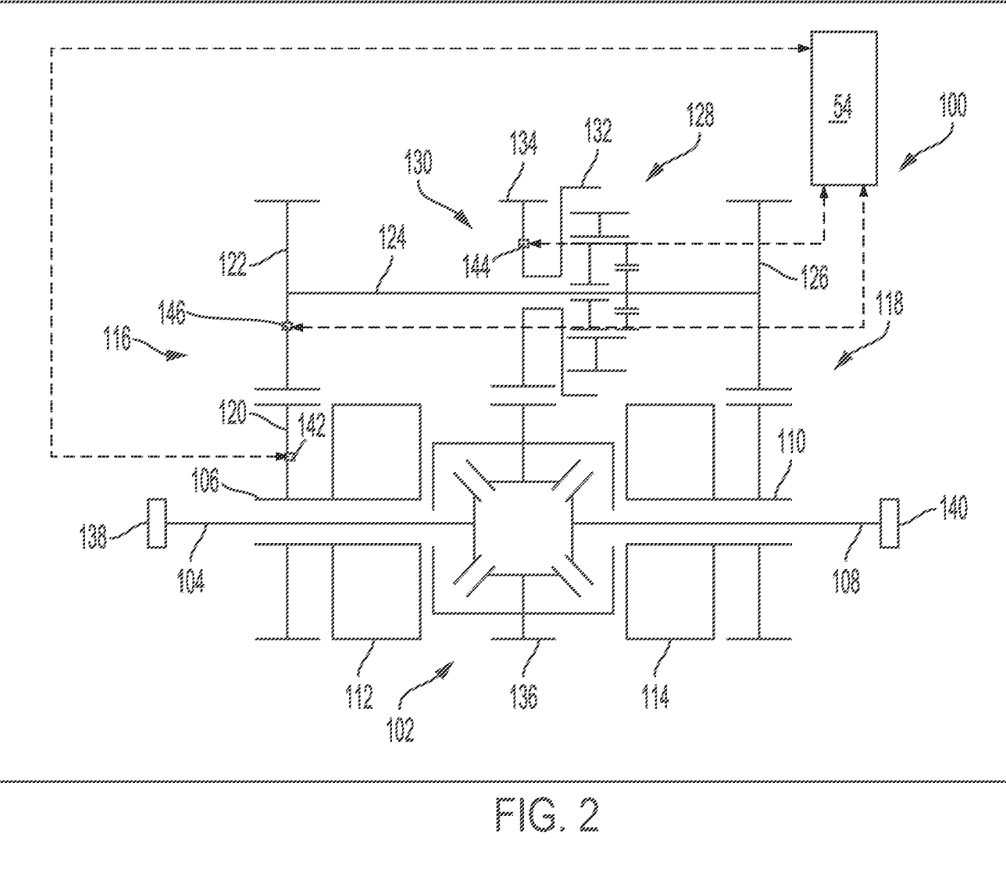
FIG. 2 is a schematic view of a second embodiment of a multi-speed electric axle assembly in accordance with the present disclosure.

However, as illustrated by a second non-limiting embodiment in FIG. 2, a multi-speed electric axle assembly 100 of the vehicle 1 may be in a parallel configuration. As used herein, the phrase "parallel configuration" refers to the electric motor generator(s) providing power that is transmitted parallel to the orientation of the axle driving wheel rotation. The axle assembly 100 comprises a differential 102 operatively attached to a first axle shaft 104 that extends through a first hollow shaft 106 and a second axle shaft 108 that extends through a second hollow shaft 110. An axis of rotation of the first axle shaft 104 may be aligned with an axis of rotation of the first hollow shaft 106. Similarly, an axis of rotation of the second axle shaft 108 may be aligned with an axis of rotation of the second hollow shaft 110. Additionally, the first hollow shaft 106 and the second hollow shaft 110 may be longitudinally aligned. The first axle shaft 104 may be operatively coupled to a first wheel 138 and the second axle shaft 108 may be operatively coupled to a second wheel 140.

The first hollow shaft 106 extends perpendicularly from and is operatively coupled to a first electric motor generator 112. The second hollow shaft 110 extends perpendicularly from and is operatively coupled to a second electric motor generator 114. Coupling the first hollow shaft 106 to the first electric motor generator 112 enables the first hollow shaft 106 to rotate about its axis of rotation. Coupling the second hollow shaft 110 to the second electric motor generator 114 enables the second hollow shaft 110 to rotate about its axis of rotation. The first hollow shaft 106 and the second hollow shaft 110 may be supported for rotation by one or more bearings.

The first hollow shaft 106 may be operatively connected to a first gear train 116. The first gear train 116 may be used to provide input to and output from the first electric motor generator 112 via the first hollow shaft 106. The second hollow shaft 110 may be operatively connected to a second gear train 118. The second gear train 118 may be used to provide input to and output from the second electric motor generator 114 via the second hollow shaft 110. The first gear train 116 and the second gear train 118 are similarly configured and thus, for brevity, only the first gear train 116 will be described below.

The first gear train 116 comprises a first gear 120 operatively attached to and rotating with the first hollow shaft 106. The first gear 120 and a second gear 122 are engaged and rotate together. The second gear 122 is operatively attached to and rotates with a first shaft 124. The first shaft 124 extends toward the second gear train 118 and is operatively attached to a second gear 126 of the second gear train 118, which rotates with the first shaft 124. The first shaft 124 may be supported for rotation by one or more bearings. In some embodiments, the first shaft 124 is provided in a parallel relationship with the first hollow shaft 106 and the second hollow shaft 110. The first shaft 124 extends into and through a first gear assembly 128 and a second gear assembly 130.

The first shaft 124 communicates power provided by the first electric motor generator 112 and the second electric motor generator 114 to the first gear assembly 128. The power communicated to the first gear assembly 128 from the first and second electric motor generators 112, 114 is transmitted by the first shaft 124 into both sides of the first gear assembly 128. In some examples, the first gear assembly 128 may be configured like the embodiment of the first gear assembly 18 of the multi-speed electric axle assembly 10 illustrated in FIG. 1. In the second embodiment, a ring gear 132 of the first gear assembly 128 is fixedly coupled to the second gear assembly 130. More particularly, the ring gear 132 is coupled with a first gear 134 of the second gear assembly 130. The first gear 134 is in meshing engagement with a second gear 136. In some embodiments, the first gear 134 and the second gear 136 may each be spur gears. For example, the first gear 134 may be a pinion gear and the second gear 136 may be a bull gear. The second gear 136 may be disposed on the differential 102. The differential 102 may be configured and operate like the differential 44 of the first embodiment of the multi-speed electric axle assembly 10 illustrated in FIG. 1.

Thus, the vehicle may operate at a first gear ratio, a second gear ratio, and a third gear ratio. For example, clutches communicatively coupled to the controller 54 may selectively engage different portions of the first gear assembly 128 in response to user input. For example, a first clutch 142 may selectively engage during the initial launch of the vehicle from an initial stopped position. The first clutch 142 may also engage if the vehicle is already in the second gear ratio and has slowed down to a speed where the first or the second electric motor generator 112, 114 cannot generate enough force to accelerate the vehicle at the rate as requested by the driver. A second clutch 144 may selectively engage during moderate speed driving and low speed driving if the vehicle load and requested acceleration rate as requested by the driver are both relatively low. The second clutch 144 may also engage if the vehicle is already in the third gear ratio and has slowed down to a speed where the first or the second electric motor generator 112, 114 cannot generate enough force to accelerate the vehicle at the rate as requested by the driver. A third clutch 146 may selectively engage during high speed driving or moderate speed driving if the vehicle load and requested acceleration rate as requested by the driver are both relatively low.

Figure 3:
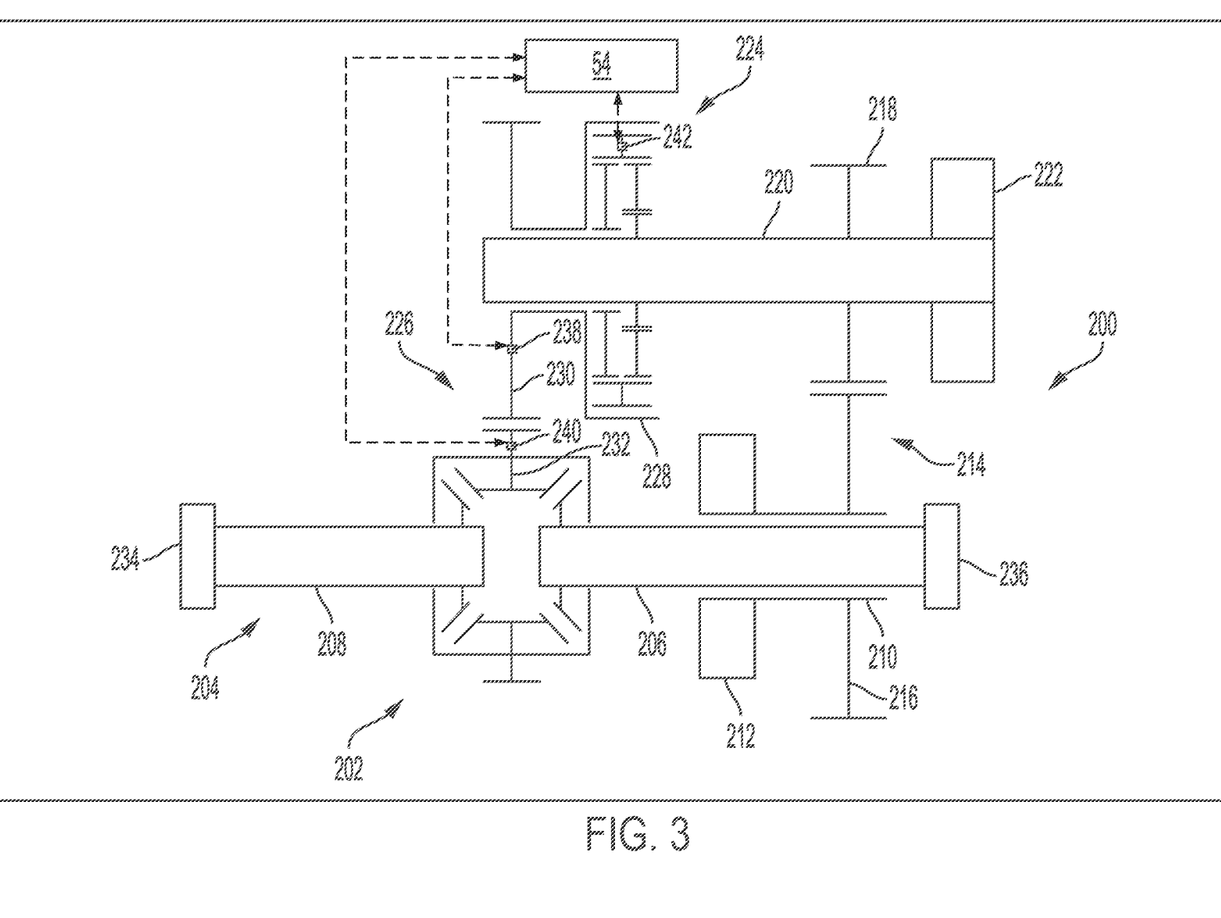
FIG. 3 is a schematic view of a third embodiment of a multi-speed electric axle assembly in accordance with the present disclosure.

In a third embodiment, as illustrated in FIG. 3, a multi-speed electric axle assembly 200 of the vehicle 1 may be in a parallel configuration and power communicated to a first gear assembly from only one side of the first gear assembly. For example, the axle assembly 200 may comprise a differential 202 operatively attached to an axle 204. The axle 204 may comprise a first axle shaft 206 and a second axle shaft 208. The first axle shaft 206 extends through a hollow shaft 210. An axis of rotation of the first axle shaft 206 may be aligned with an axis of rotation of the hollow shaft 210. The first axle shaft 206 may be operatively coupled to a first wheel 234 and the second axle shaft 208 may be operatively coupled to a second wheel 236. The hollow shaft 210 perpendicularly extends from and is operatively coupled to a first electric motor generator 212. Coupling the hollow shaft 210 to the first electric motor generator 212 enables the hollow shaft 210 to rotate about its axis of rotation. The hollow shaft 210 may be supported for rotation by one or more bearings.

The hollow shaft 210 may be operatively connected to a first gear train 214. The first gear train 214 may be utilized to provide input to and output from the first electric motor generator 212. The first gear train 214 comprises a first gear 216 and a second gear 218. The first gear 216 is operatively attached to and rotating with the hollow shaft 210. The first gear 216 and the second gear 218 are engaged and rotate together. The second gear 218 is operatively attached to and rotates with a first shaft 220.

The first shaft 220 longitudinally extends toward and is operatively coupled to a second electric motor generator 222. The first shaft 220 rotates about an axis of rotation from power transmitted by the second electric motor generator 222 and the first electric motor generator 212, with power from transmitted from the first electric motor generator 212 by way of the first gear train 214 and the hollow shaft 210. The first shaft 220 may be supported for rotation by one or more bearings. In some embodiments, the first shaft 220 is provided in a parallel relationship with the hollow shaft 210. The first shaft 220 also extends toward, into, and through a first gear assembly 224 and a second gear assembly 226.

The first shaft 220 communicates power provided by the first and second electric motor generators 212, 222 to the first gear assembly 224. As illustrated in FIG. 3, the power communicated to the first gear assembly 224 from the first and second electric motor generators 212, 222 is transmitted by the first shaft 220 into only one side of the first gear assembly 224. In some examples, the first gear assembly 224 may be configured like the first gear assembly 18 of the first embodiment of the multi-speed electric axle assembly 10 illustrated in FIG. 1.

In the third embodiment, a ring gear 228 of the first gear assembly 224 is fixedly coupled to the second gear assembly 226. More particularly, the ring gear 228 is coupled with a first gear 230 of the second gear assembly 226. The first gear 230 is in meshing engagement with a second gear 232. In some embodiments, the first gear 230 and the second gear 232 may each be spur gears. For example, the first gear 230 may be a pinion gear and the second gear 232 may be a bull gear. The second gear 232 may be disposed on the differential 202. The differential 202 may be configured and operate like the differential 44 of the first embodiment of the multi-speed electric axle assembly 10 illustrated in FIG. 1.

Thus, the vehicle may operate at a first gear ratio, a second gear ratio, and a third gear ratio. For example, clutches communicatively coupled to the controller 54 may selectively engage different portions of the first gear assembly 224 in response to user input. For example, a first clutch 238 may selectively engage during the initial launch of the vehicle from an initial stopped position. The first clutch 238 may also engage if the vehicle is already in the second gear ratio and has slowed down to a speed where the first or second electric motor generators 212, 222 cannot generate enough force to accelerate the vehicle at the rate as requested by the driver. A second clutch 240 may selectively engage during moderate speed driving and low speed driving if the vehicle load and requested acceleration rate as requested by the driver are both relatively low. The second clutch 240 may also engage if the vehicle is already in the third gear ratio and has slowed down to a speed where the first or second electric motor generators 212, 222 cannot generate enough force to accelerate the vehicle at the rate as requested by the driver. A third clutch 242 may selectively engage during high speed driving or moderate speed driving if the vehicle load and requested acceleration rate as requested by the driver are both relatively low.

Figure 4:
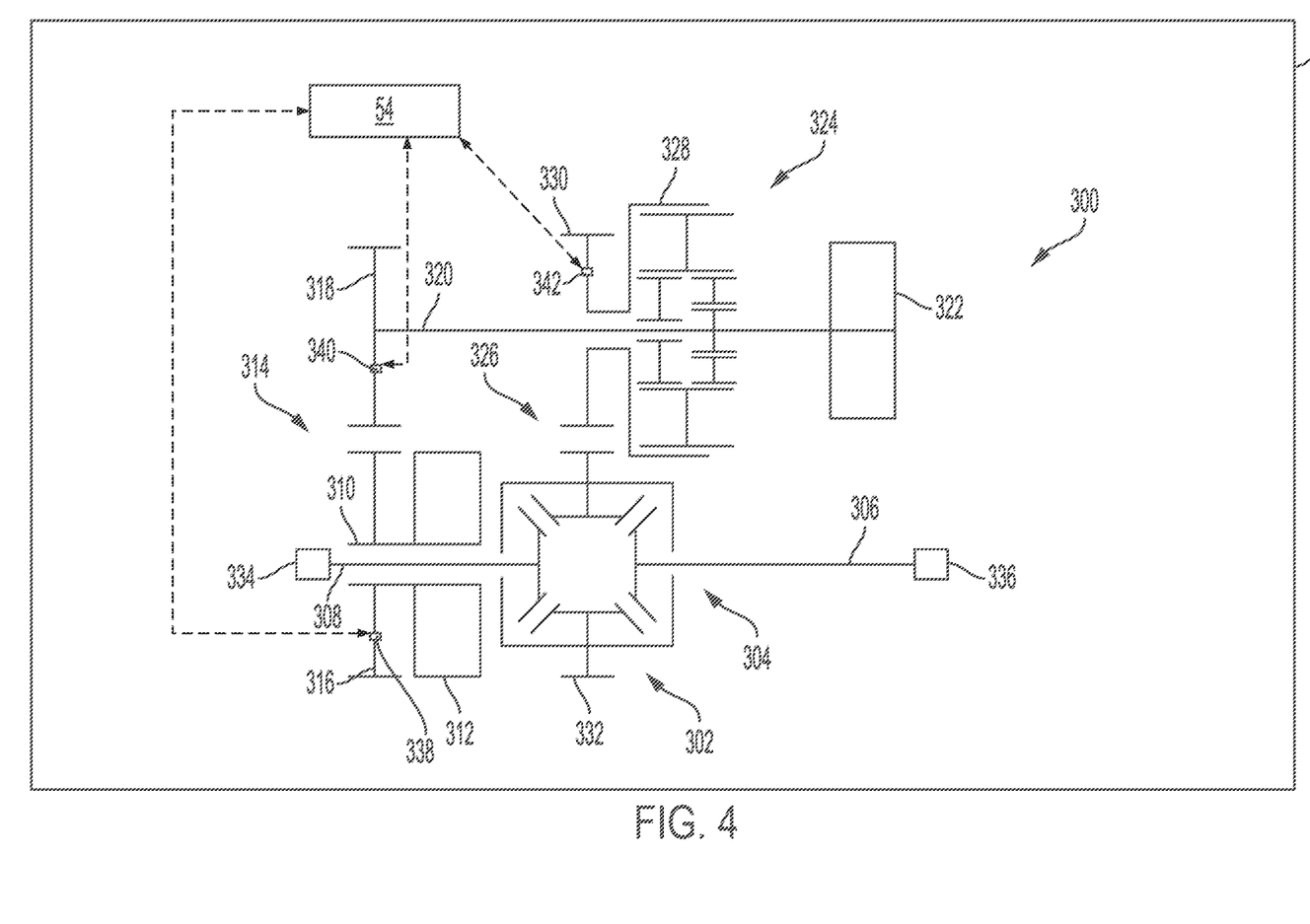
FIG. 4 is a schematic view of a fourth embodiment of a multi-speed electric axle assembly in accordance with the present disclosure.

In a fourth embodiment, as illustrated in FIG. 4, a multi-speed electric axle assembly 300 of the vehicle 1 may be in a parallel configuration and power communicated to a first gear assembly from both sides of a first gear assembly. The axle assembly 300 comprises a differential 302 operatively attached to an axle 304. The axle 304 may comprise a first axle shaft 306 and a second axle shaft 308. The second axle shaft 308 extends through a hollow shaft 310. The first axle shaft 306 may be operatively coupled to a first wheel 334 and the second axle shaft 308 may be operatively coupled to a second wheel 336. An axis of rotation of the second axle shaft 308 may be aligned with an axis of rotation of the hollow shaft 310.

The hollow shaft 310 extends perpendicularly from and is operatively coupled to a first electric motor generator 312. Coupling the hollow shaft 310 to the first electric motor generator 312 enables the hollow shaft 310 to rotate about its axis of rotation. The hollow shaft 310 may be supported for rotation by one or more bearings. The hollow shaft 310 may be operatively connected to a first gear train 314. The first gear train 314 may be used to provide input to and output from the first electric motor generator 312. The first gear train 314 comprises a first gear 316 operatively attached to and rotating with the hollow shaft 310. The first gear 316 and a second gear 318 are engaged and rotate together. The second gear 318 is operatively attached to and rotates with a first shaft 320.

The first shaft 320 extends toward and is operatively coupled to a second electric motor generator 322. The first shaft 320 rotates about an axis of rotation from power transmitted by the second electric motor generator 322 and the first electric motor generator 312, with power transmitted from the first electric motor generator 312 by way of the first gear train 314 and the hollow shaft 310. The first shaft 320 may be supported for rotation by one or more bearings. In some embodiments, the first shaft 320 is provided in a parallel relationship with the hollow shaft 310.

The first shaft 320 also extends away from the first gear train 314 toward, into, and through a first gear assembly 324 and a second gear assembly 326. The first shaft 320 communicates power provided by the first and second electric motor generators 312, 322 to the first gear assembly 324. The power communicated to the first gear assembly 324 from the first electric motor generator 312 is transmitted by the first shaft 320 into a first side of the first gear assembly 324 and the power communicated to the first gear assembly 324 from the second electric motor generator 322 is transmitted by the first shaft 320 into a second side of the first gear assembly 324. In some embodiments, the first gear assembly 324 is configured like the first gear assembly 18 of the first embodiment of the multi-speed electric axle assembly 10 illustrated in FIG. 1.

In the fourth embodiment, a ring gear 328 of the first gear assembly 324 is fixedly coupled to the second gear assembly 326. More particularly, the ring gear 328 is coupled with a first gear 330 of the second gear assembly 326. The first gear 330 is in meshing engagement with a second gear 332. In some embodiments, the first gear 330 and the second gear 332 may each be spur gears. For example, the first gear 330 may be a pinion gear and the second gear 332 may be a bull gear. The second gear 332 may be disposed on the differential 302. The differential 302 may be configured and operate like the differential 44 of the first embodiment of the multi-speed electric axle assembly 10 illustrated in FIG. 1.

Thus, the vehicle may operate at a first gear ratio, a second gear ratio, and a third gear ratio. For example, clutches communicatively coupled to the controller 54 may selectively engage different portions of the first gear assembly 324 in response to user input. For example, a first clutch 338 may selectively engage during the initial launch of the vehicle from an initial stopped position. The first clutch 338 may also engage if the vehicle is already in the second gear ratio and has slowed down to a speed where the first or second electric motor generators 312, 322 cannot generate enough force to accelerate the vehicle at the rate as requested by the driver. A second clutch 340 may selectively engage during moderate speed driving and low speed driving if the vehicle load and requested acceleration rate as requested by the driver are both relatively low. The second clutch 340 may also engage if the vehicle is already in the third gear ratio and has slowed down to a speed where the first and second electric motor generators 312, 322 cannot generate enough force to accelerate the vehicle at the rate as requested by the driver. A third clutch 342 may selectively engage during high speed driving or moderate speed driving if the vehicle load and requested acceleration rate as requested by the driver are both relatively low.

Figure 5:
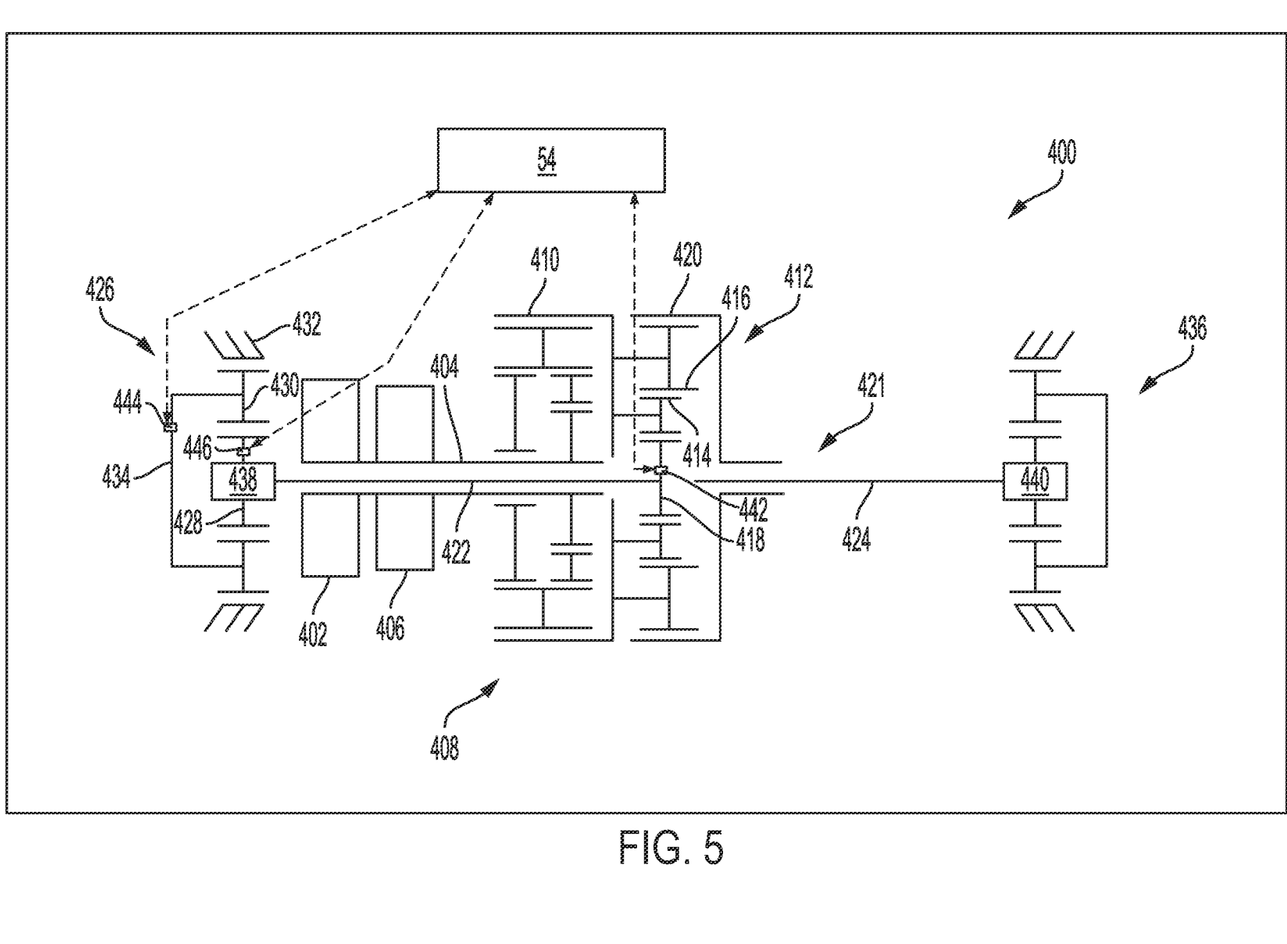
FIG. 5 is a schematic view of a fifth embodiment of a multi-speed electric axle assembly in accordance with the present disclosure.

A fifth embodiment of a multi-speed electric axle assembly 400 of the vehicle 1 is illustrated in FIG. 5. In the fifth embodiment, the multi-speed electric axle assembly 400 comprises a first electric motor generator 402, with a first shaft 404 operably coupled to the first electric motor generator 402 for rotation. The first shaft 404 extends from the first electric motor generator 402 toward a second electric motor generator 406, with the first shaft 404 also operably coupled to the second electric motor generator 406 for rotation. The first electric motor generator 402 and the second electric motor generator 406 each provide power, which can drive the axle assembly 400. The first shaft 404 may be supported for rotation by one or more bearings.

The first shaft 404 is hollow and also extends into a first gear assembly 408. Power may be communicated to the first gear assembly 408 from the first and second electric motor generators 402, 406 via the first shaft 404, with power transmitted into only one side of the first gear assembly 408. In some examples, the first gear assembly 408 may be configured like the first gear assembly 18 of the first embodiment of the multi-speed electric axle assembly 10 illustrated in FIG. 1. In the fifth embodiment, a ring gear 410 of the first gear assembly 408 is operably coupled to a differential 412. More particularly, the ring gear 410 is operably coupled to a first gear set 414 and a second gear set 416 of the differential 412. Each gear of the first gear set 414 is in meshing engagement with a gear of the second gear set 416. In some embodiments, the first gear set 414 and the second gear set 416 may each comprise planetary gears. For example, each gear of the first gear set 414 is in meshing engagement with a sun gear 418. Each gear of the second gear set 416 is in meshing engagement with a ring gear 420.

Due to the configuration of the axle assembly 400, the differential 412 may operate at a first speed, a second speed, and a third speed as further described below.

The differential 412 may be operatively attached to an axle 421. The axle 421 may comprise a first axle shaft 422 and a second axle shaft 424. The first axle shaft 422 may be operatively coupled to a first wheel 438 and the second axle shaft 424 may be operatively coupled to a second wheel 440. The sun gear 418 is attached to the first axle shaft 422. The ring gear 420 is operably coupled to the second axle shaft 424. In some embodiments, the ring gear 420 is coupled to the second axle shaft 424 via a splined connection. In some embodiments, the differential 412 is of the epicyclic variety. The first axle shaft 422 may be supported for rotation with one or more bearings (not depicted). The first axle shaft 422 extends away from the sun gear 418 toward and through the first gear assembly 408. The first axle shaft 422 also extends toward and through the hollow first shaft 404, terminating at a first gear reduction 426 located beyond the first and second electric motor generators 402, 406.

The first gear reduction 426 is operably coupled to an end of the first axle shaft 422 (e.g., opposite the end of the first axle shaft 422 attached to the sun gear 418). In an embodiment, the first gear reduction 426 includes a sun gear 428. The sun gear 428 is in meshing engagement with a planetary gear set 430. In some embodiments, the planetary gear set 430 is in meshing engagement with a stationary ring 432. Preferably, the planetary gear set 430 is held by a planet carrier 434. The planet carrier 434 is coupled with a wheel for rotation therewith.

From the differential 412, the second axle shaft 424 extends toward an end of the second axle shaft 424. The second axle shaft 424 may be supported for rotation with one or more bearings. A second gear reduction 426 is operably coupled to the end of the second axle shaft 424. The second gear reduction 436 is configured in a manner similar to the first gear reduction 426 and thus includes a planetary gear set held by a planetary carrier, where the planetary gear set is in meshing engagement with a stationary ring.

Thus, the multi-speed electric axle assembly 400 may operate at a first gear ratio, a second gear ratio, and a third gear ratio. For example, clutches communicatively coupled to the controller 54 may selectively engage different portions of the first assembly 408 in response to user input. For example, a first clutch 442 may selectively engage during the initial launch of the vehicle from an initial stopped position. The first clutch 442 may also engage if the vehicle is already in the second gear ratio and has slowed down to a speed where the first or second electric motor generators 402, 406 cannot generate enough force to accelerate the vehicle at the rate as requested by the driver. A second clutch 444 may selectively engage during moderate speed driving and low speed driving if the vehicle load and requested acceleration rate as requested by the driver are both relatively low. The second clutch 444 may also engage if the vehicle is already in the third gear ratio and has slowed down to a speed where the first or second electric motor generators 402, 406 cannot generate enough force to accelerate the vehicle at the rate as requested by the driver. A third clutch 446 may selectively engage during high speed driving or moderate speed driving if the vehicle load and requested acceleration rate as requested by the driver are both relatively low.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims, which follow below.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, a multi-speed electric axle assembly according to the embodiments disclosed herein may provide a user with exactly three individual gear ratios to select from when driving an EV. The multi-speed electric axle assembly comprises one or more power supplies and one or more shafts integrated with a gear assembly, with the three individual gear ratios achieved by locking different portions of the gear assembly. The individual gear ratios may be selected via various clutch actuations using a set of actuators and clutches. By utilizing a simple clutch assembly as described herein, the multi-speed electric axle assembly may take up minimal space within a vehicle while maintaining a high torque carrying capacity.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A multi-speed electric axle assembly, comprising:
   a first motor generator;
   a first shaft in mechanical communication with the first motor generator;
   a first gear assembly in mechanical communication the first shaft, the first gear assembly including a first sun gear, a first gear set in meshing engagement with the first sun gear, a second gear set in meshing engagement with the first gear set, a second sun gear, and a ring gear;
   wherein the first gear set and the second gear set are coupled to a carrier;
   wherein the carrier is selectively coupled to a first grounded member to operate in a first mode;
   wherein the second sun gear is selectively coupled to a second grounded member to operate in a second mode;
   wherein the first sun gear is selectively coupled to the second sun gear via a clutch to operate in a third mode; and
   a differential in mechanical communication with the first gear assembly and two axle shafts that are coupled to two wheels; and
   wherein the multi-speed electric axle assembly does not include an internal combustion engine.

2. The multi-speed electric axle assembly of claim 1, wherein the first motor generator is arranged perpendicular to the differential.

3. The multi-speed electric axle assembly of claim 1, further comprising a second motor generator rotationally coupled to the first motor generator.

4. The multi-speed electric axle assembly of claim 3, wherein the first motor generator and the second motor generator are coaxially arranged.

5. The multi-speed electric axle assembly of claim 1, further comprising a controller configured to command selective engagement of the first grounded member, the second grounded member, and the clutch.

6. The multi-speed electric axle assembly of claim 1, wherein the first sun gear has an outermost diameter that is smaller than an outermost diameter of the second sun gear.

7. The multi-speed electric axle assembly of claim 1, wherein the multi-speed electric axle assembly is a steerable axle assembly.

8. The multi-speed electric axle assembly of claim 1, wherein the multi-speed electric axle assembly is a non-steerable axle assembly.

9. The multi-speed electric axle assembly of claim 1, wherein the multi-speed electric axle assembly only includes the first gear assembly and a second gear assembly.

10. The multi-speed electric axle assembly of claim 1, wherein the first gear assembly is a Ravigneaux gear set.

11. The multi-speed electric axle assembly of claim 1, wherein the multi-speed electric axle assembly is included in a heavy duty commercial vehicle.

* * * * *